E. E. McCOLLUM.
SPEED REDUCING MECHANISM.
APPLICATION FILED APR. 24, 1922.
1,431,167. Patented Oct. 10, 1922.
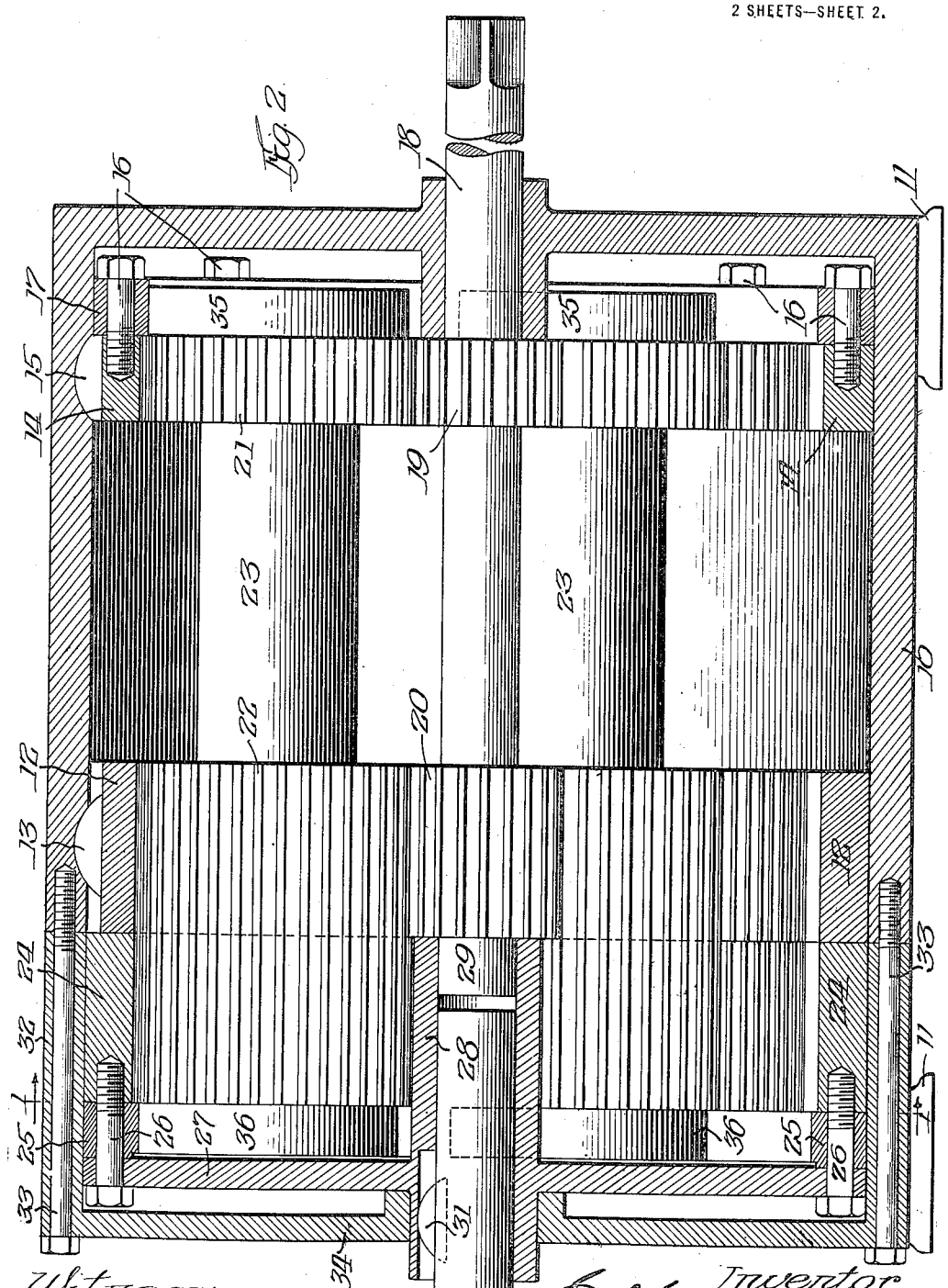

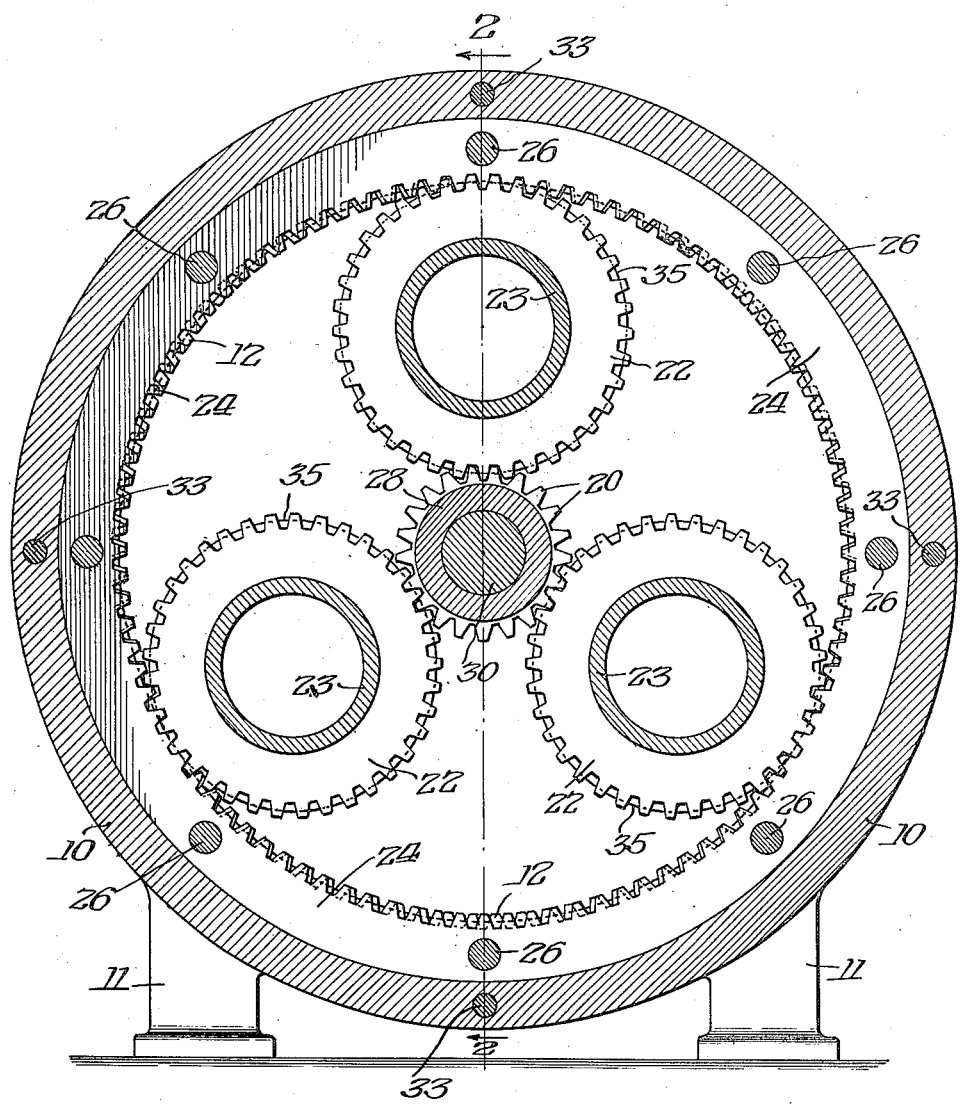

Patented Oct. 10, 1922.

1,431,167

UNITED STATES PATENT OFFICE.

EARL E. McCOLLUM, OF DOWNERS GROVE, ILLINOIS.

SPEED-REDUCING MECHANISM.

Application filed April 24, 1922. Serial No. 556,208.

*To all whom it may concern:*

Be it known that I, EARL E. MCCOLLUM, a citizen of the United States, and resident of Downers Grove, in the county of Du Page and State of Illinois, have invented certain new and useful Improvements in a Speed-Reducing Mechanism, of which the following is a specification.

My invention relates to speed reducing mechanisms and particularly to a novel construction adapted for high ratios of reduction and which may be employed either as a straight line drive or as a hoist.

One of the objects of my invention is to provide a construction in which the torsional strains incident to the transmission of power from one set of gears to another are reduced. Such strains have heretofore constituted a serious and in fact, insurmountable objection to the use of reducing mechanisms in which two internal gear rings are placed side-by-side, said rings having a different number of teeth but being of the same pitch diameter, the rings being engaged by a revolving pinion.

In my construction the objectionable strains together with the usual noise and frictional loss of operation are eliminated by providing a duplicate series of gears consisting of a driving pinion, revolving pinions and internal ring, all of standard tooth construction, said gear train being spaced away from the main operating gears. The driving pinion, idler pinions and ring gear are all integrally connected with the corresponding elements in the main drive but are located in spaced-away relation in order to offset and in fact substantially entirely eliminate the strains heretofore referred to.
Except for the two separate spaced apart gear trains, the construction is identical in principle of operation to that shown in the patent to Thomson, No. 476,101 of 1892.

The invention will be better understood by reference to the accompanying drawings in which, Fig. 1 is a sectional view through a speed reducing device constructed in accordance with my invention, the section being taken on the line 1—1 of Fig. 2, and, Fig. 2 is a longitudinal vertical sectional view taken on the line 2—2 of Fig. 1.

In the specific application of the device shown in the drawings, I provide a casing 10, which may be supported on legs 11, adapted to be secured to a foundation. Mounted within the casing is an internal gear ring 12, fixed to the casing by means of a key 13, and constituting a part of the main gear train. Also secured within the casing is an internal gear ring 14, held in place by means of a key 15 and constituting a part of the auxiliary or balancing gear train. The gear rings 12—14, are provided with teeth of standard construction and of the same number of teeth and having the same pitch diameter. Secured to the gear ring 14, by means of bolts 16, is a pitch line guide 17.

A centrally arranged drive shaft 18 is mounted in the casing the shaft carrying a pinion 19, constituting a part of the balancing gear train, and a pinion 20, constituting a part of the main gear train. These drive pinions engage respectively the idler pinions 21, 22, of which three are shown, these pinions being rigid with shafts 23. The pinions 22 are of a length substantially twice as great as the length of the gear 12, and engage an internal gear ring 24, mounted for rotation within the casing. This constitutes the slow speed element. The gear is of the same pitch diameter as the gears 12, 14, but has a different number of teeth. In the adaptation shown I provide a number of teeth, three less than the teeth in the internal gears 12, 14; this when correlated with the remaining gear ratios results in a speed reduction of 350 to 1. The ring 24 is provided with a pitch line guide 25, held in place by bolts 26, which serve also to retain a slow speed driving disk 27, in position. This disk is provided with an integral hub 28, which serves to support in its concentric opening the over-hung end 29 of the shaft 18, and a slow speed drive shaft 30, the latter being secured by a key 31 to the hub and disk 27.

The slow speed parts are contained within a removable cap 32, which constitutes a part of the casing 10, and is joined thereto by the long bolts 33. The end wall 34 of the cap serves to close the casing and prevent the escape of oil and grease.

In each end of the shafts 23, carrying the pinions 21, 22, is a circular projection on which pitch-line-guide-rings 35, 36, are mounted. These engage the pitch line guides 17, 25, and operate in a well known manner.

In operation, power being applied to the shaft 18, the pinions 19, 20, and the floating pinions 21, 22, are caused to rotate or revolve as the case may be. The floating pinions 22 engage the teeth of the fixed gear ring 12, and the movable gear ring 24, and due to the different number of teeth thereof cause relative rotation. The rotation in the construction shown is of the gear 24, the gear 12 being fixed. If only the gears 12, 24, and pinions 22 are employed, a material loss of efficiency and resultant wear would accrue and the device would be inoperative for practical purposes. However, by providing the balancing or auxiliary gear train consisting of the high speed gear 19, the floating pinion 21 and the internal gear ring 14, the twisting tendency is overcome and a speed reducing mechanism is provided which, contrary to the usually accepted theory, results in an efficiency which increases rather than diminishes with the increase of ratio.

However, much depends upon the contour of the bastard teeth in the ring 24 and the practical efficiency of the device wholly depends upon the ability to cut such teeth. As a result of several years of experimental work and study I am convinced that the only practical method of cutting such teeth is that disclosed in my co-pending application Serial No. 497,999, filed Sept. 2, 1921.

The construction described is that intended for use as a straight line drive, the slow speed shaft being directly in line with the high speed shaft. If, however, the device is to be used as a hoist or as a right angle drive, the slow speed gear ring and its associated parts will be held against rotation whereupon the casing and its connected gear rings 12, 14, will constitute the slow speed element.

Obviously the construction is capable of considerable modification particularly as to the extent of separation of the main and auxiliary gear trains. It is possible also that the main driving pinion 20 may be extended to engage more or less of the main floating pinion 22. I have found, however, that the construction illustrated, both as to proportion and arrangement of parts, operates satisfactorily and with the best efficiency. I do not, however, wish to be limited except as indicated in the appended claims.

I claim:

1. In a speed reduction mechanism, the combination of a casing, a pair of gear rings of the same pitch diameter and of a different number of teeth, one of said rings being fixed to said casing, a centrally arranged drive pinion, planetary pinions engaging said ring gears and said drive pinion, and a balancing gear train, spaced away from the described main drive, and comprising a drive pinion fixed to the drive shaft, planetary pinions fixed to said first mentioned planetary pinions, and a gear ring fixed to said casing.

2. In a speed reduction mechanism, the combination of a casing, a pair of gear rings of the same pitch diameter, one of said rings having teeth of standard construction and being fixed to the casing, the other ring having a different number of teeth of bastard construction and being free to rotate, a central drive pinion, planetary pinions engaging both of said ring gears and said drive pinion, and a balancing gear train spaced a substantial distance away from the described main drive and comprising a drive pinion fixed to the drive shaft, planetary pinions fixed to said first mentioned planetary pinions, and a gear ring fixed to said casing, the teeth of all said last named gears being of standard construction.

3. In a speed reduction mechanism, the combination of a casing, a pair of side-to-side contacting gear rings of the same pitch diameter and of a different number of teeth, one of said rings being fixed to said casing, a centrally arranged drive pinion, planetary pinions engaging said ring gears and said drive pinion, and a balancing gear train, spaced away from the described main drive and comprising a drive pinion fixed to the drive shaft, planetary pinions fixed to said first mentioned planetary pinions, and a gear ring fixed to said casing.

Signed at Chicago, Illinois, this 21st day of April, 1922.

EARL E. McCOLLUM.